United States Patent [19]

Friedman et al.

[11] Patent Number: 4,800,960
[45] Date of Patent: Jan. 31, 1989

[54] CONSOLIDATABLE GRAVEL PACK METHOD

[75] Inventors: Robert H. Friedman; Billy W. Surles, both of Houston, Tex.

[73] Assignee: Texaco Inc., White Plains, N.Y.

[21] Appl. No.: 135,162

[22] Filed: Dec. 18, 1987

[51] Int. Cl.$^4$ .................... E21B 33/138; E21B 43/04
[52] U.S. Cl. ................................. 166/276; 166/295
[58] Field of Search ............... 166/295, 280, 276; 523/131

[56] References Cited

U.S. PATENT DOCUMENTS

| | | | |
|---|---|---|---|
| 4,042,032 | 8/1977 | Anderson et al. | 166/295 X |
| 4,427,069 | 1/1984 | Friedman | 166/295 |
| 4,428,427 | 1/1984 | Friedman | 166/295 X |
| 4,556,109 | 12/1985 | Eilers | 166/295 |
| 4,669,543 | 6/1987 | Young | 166/295 X |
| 4,694,905 | 9/1987 | Armbruster | 166/280 |

Primary Examiner—Stephen J. Novosad
Attorney, Agent, or Firm—Jack H. Park; Kenneth R. Priem

[57] ABSTRACT

Disclosed is a method for controlling sand flow in an producing well by forming a permeable consolidated gravel pack. Gravel is coated with a resin such as an oligomer of furfuryl alcohol containing an ester and as a catalyst an oil soluble, slightly water soluble organic acid such as anthranilic acid. The resin coated gravel is suspended in a carrier fluid comprising saturated brine and optionally a viscosity increasing polymer. The fluid comprising resin coated gravel and the carrier fluid are pumped through the well into the formation adjacent to the producing well. Heat or pressure cause joining of adjacent coated gravel to form the consolidated gravel pack.

8 Claims, No Drawings

CONSOLIDATABLE GRAVEL PACK METHOD

FIELD OF THE INVENTION

This invention relates to methods and composition for gravel packing wells for the purpose of forming a permeable barrier around the perforations of a producing wellbore to restrain the movement of unconsolidated sand into the well during production of petroleum or other fluids from the subterranean formation.

BACKGROUND OF THE INVENTION

One of the problems frequently encountered during the course of producing petroleum and other fluids from subterranean formations is the inadvertent flow of sand or other mineral particles from the petroleum formation along with the fluid being recovered into the producing wellbore. This is a well recognized problem and many undesired consequences result from this phenomena. The flow of sand into the wellbore can produce a cavity or zone of greatly weakened formation around the perforations of the wellbore, such that in severe cases, the formation will collapse and destroy the casing and cause loss of the well. Also, continued production of fluid with simultaneous flow of sand or other particulate formation matter from the formation into the wellbore will cause the wellbore itself to become plugged, which will prevent the further production of oil from that well. Finally, sand being transported to the surface of the earth along with fluids causes abrasive wear of the tubular goods and pumps utilized in production wells, which cause early failure of these expensive components.

The above problems have long been recognized and many procedures have been disclosed and employed with varying degrees of success for the purpose of controlling the production of sand along with formation fluids. Numerous techniques have been utilized, most having the common feature of employing methods and procedures with the hope of forming the stable permeable zone around the production means in the producing well such that fluid can be freely produced from the formation, while particulate matter such as sand or other formation particles are restrained from flowing to and through the perforations in the wellbore.

When the problem of sand flow has progressed over a long period of time without corrective measures being taken, substantial zones which have been washed out in the portion of the formation immediately adjacent to the wellbore are sometimes formed, and it is common practice in the oil field to apply techniques referred to generally as gravel packing in order to form a zone where the cavities previously existed which will facilitate production of fluids from the formation while restraining the movement of particulate matter such as sand into the wellbore. The term gravel is commonly used in this application somewhat loosely and refers generally to rigid particulate matter ranging in size from that of coarse sand to pebble size materials. Ordinarily, mineral materials constitute the gravel employed in these processes, although glass or ceramic particles may also be employed.

In most prior art methods, sand or gravel is placed in the washed out zones, after which some material is introduced into the gravel packed area to cement or bind the granular particles together so as to prevent the flow of these particles into the well once production is resumed.

One technique that has been utilized with varying degrees of success involves the injection of polymerizable resin into the gravel packed zone, or by the formulation of a slurry of the gravel precoated with resinous material which can be pumped into the washed out zone. After placement, the thermal setting resin bonds the particulate matter together to form a permeable, consolidated structure. This technique has been shown to be technically feasible, but it is expensive and not always entirely satisfactory. The weakness of prior art methods has been especially serious when attempt has been made to treat production wells formed in earth formations to which steam stimulation is being applied for the purpose of increasing the production of viscous petroleum. The high temperature fluids produced in such wells causes rapid deterioration of the resins utilized to bond the gravel particles together.

In U.S. Pat. No. 4,427,069, a method for consolidating sand naturally existing in an earth formation adjacent to a producing well utilizing as a polymerizable resin, a furfuryl alcohol oligomer, which produced a strong and durable resin bonding the sand grains together while still maintaining sufficient permeability to permit the production of fluid from the formation. This resin is particularly attractive in that it is stable at the high temperatures normally encountered during the passage of fluids from a formation which is being stimulated by steam flooding. In U.S. Pat. No. 4,428,427 which issued Jan. 31, 1984, a gravel pack forming technique employing a similar resin to precoat gravel or other particulate matter and introduce a fluid comprising the suspended granular material into the washed-out zone or cavity adjacent to producing well was disclosed.

Both of the above techniques have been very successful and shown to be more durable in high temperature operations than most other known sand consolidation or consolidated gravel pack methods; however, some problems have been encountered in connection with each method. In the sand consolidation method of U.S. Pat. No. 4,427,069, introduction of a resinous material into a sand zone in the formation does not accomplish completely uniform coating of the sand grains with resin as is possible if the particulate matter is coated with resin prior to introduction into the formation. The more successful technique involves the forming of a resin-coated gravel as described in U.S. Pat. No. 4,428,427 and introducing a suspension of this resin-coated gravel into the formation, after which the well is shut-in for a sufficient period of time to cause polymerization of the resin coating as a consequence of natural formation temperatures. While quite successful, the method is expensive, and a major portion of the expense is associated with the fact that the gravel is coated with resin, dried and stored in containers which can be easily transported from the plant where the resin-coating is applied to the particulate matter to the oil field. These containers of resin-coated gravel have been stored near the well where they are to be used until the appropriate time for formulating the consolidated gravel pack arrives. Since the resin constitutes the major chemical cost of the coated sand, but the gravel represents by far the larger portion of the total weight of the precoated gravel, the shipping cost for the resin coated gravel are quite high. Coating and drying costs are also quite high. Also, storage of the material during warm weather frequently causes undesired thermal polymerization of the resin-coated sand particles in the shipping container, rendering the material useless for the intended purpose.

Attempts to coat the gravel at the site where the consolidation procedure will be applied have not been altogether satisfactory because the resin-coated gravel has a tacky or sticky quality. It is difficult and expensive to dry these particles at the well site. Unless the particles are dried, however, suspension of the undried resin-coated gravel particles in an aqueous fluid for the purpose of the transportation down the wellbore and placement in the washed-out zone where the consolidated mass is desired, has resulted in the particles sticking together, which prevents forming a strong, uniform permeability consolidated gravel pack. Moreover, if the resin-coated particles are suspended in water, the water washes at least a portion of the resin off the sand or gravel grains, which reduces the ultimate strength of the consolidated gravel pack. If the particles are suspended in an oil based fluid, the resin absorbs oil from the carrier fluid which results in the resin becoming even more sticky and tacky than it was prior to contact with the oil.

In view of the foregoing discussion, it can be appreciated that there is a substantial unfulfilled commercial need for a technique for forming a consolidated gravel pack in a producing oil well to restrain flow of unconsolidated sand particles into the well, by a method in which the gravel particles are coated with resin at about the time and place that they are to be employed in the sand consolidation technique, without attempting to dry the particles, while avoiding the problem of washing resin off the resin-coated gravel particles or increasing the tackiness of these particles during the period when they are pumped down the tubing for placement in the zone of the formation adjacent to the producing well. For such a procedure to be successful, there is also a need to incorporate a catalyst in the resin-coated sand containing fluid whose activity is delayed until the resin-coated gravel has been placed in the washed out cavity adjacent to the producing well.

The present invention is directed to compositions and methods employing compositions whereby the above mentioned objectives and unfulfilled needs may be satisfied. The invention is directed toward methods of forming a composition comprising granular particles of mineral matter such as gravel coated with a heat polymerizable resin dispersed in a fluid which prohibits either removal of the resin coating from the sand grains or premature sticking of the resin-coated gravel grains together during the period while they are being formulated and pumped into the wellbore for the purpose of forming the consolidated gravel mass in the formation adjacent to the production means of the producing well.

SUMMARY OF THE INVENTION

Applicants' invention pertains to compositions and methods employing these compositions whereby a competent, permeable mass may be formulated in the portion of a oil-producing formation adjacent to the perforations or other fluid production means in the producing well, to permit passage of fluid through the flow channels in the permeable consolidated sand mass while restraining the flow of formation particulate matter such as sand into the well. This method permits forming the resin-coated sand grains at the well site under conditions which avoid premature thermal polymerization of the resins during storage in warm climates, while avoiding the removal of the resin material from the particulate matter during the period that the resin coated particulate matter is suspended in a carrier fluid. A catalyst system is utilized which may be deactivated until after the resin-coated gravel has been placed in the cavity adjacent to the well, but becomes active after the coated gravel is in place. In preferred mode, a solution is prepared that contains about 80 percent resin and 19 percent butyl acetate and from 0.8 to 1.2 percent acid catalyst such as o-nitrobenzoic acid. It is usually not necessary to dry or otherwise treat the gravel prior to coating the gravel with resin. Gravel and the resin solution are mixed to produce resin coated gravel, which is then added to a carrier fluid which is water saturated or nearly saturated with sodium chloride which also can contain a viscosifying amount of hydrophilic polymer, preferably hydroxyethylcellulose and about 0.1 percent fluorescent dye. The high salt content promotes loss of water from the resin coating the gravel prior to placement of the resin-coated gravel in the desired location in the producing well, and also avoids washing the resin off the sand grains. The presence of the viscosifying polymer in the aqueous carrier medium reduces abrasive contact between the resin-coated gravel particles and prevents or reduces settling of these coated gravel during the placement process.

Any acid catalyzed polymerizable resinous material which can be used to coat the gravel particles, and then be suspended in the carrier fluid for placement in the formation cavity can be used in our invention. A particularly preferred resin is a furfuryl alcohol oligomer, $(C_4H_3OCH_2)_xH$, which is a relatively inexpensive polymerizable resin which auto-polymerizes upon exposure to acid catalyst forming a thermosetting resin which cures to an insoluble mass highly resistant to chemical attack and thermal degradation. Specifically, it is recommended that the resin used be Quacorr 1300, marketed by Q. O. Chemical or the essentially identical EX18663 made by Acme Resin Corp. This particular resin is favored because it is oil soluble.

The furfuryl alcohol oligomer may be desirably diluted with an appropriate solvent such as butyl acetate to decrease viscosity of the fluid such that it can be manageably used to coat the gravel.

As the furfuryl alcohol oligomer comes into contact with the acidic catalyst, the action of the heat in the formation and catalyst drives the auto-polymerization reaction forward. Thus, the alcohol oligomer polymerizes to a resin mass.

As the polymerization reaction proceeds, water is produced as a by-product. If this water production is allowed to go unchecked, the polymerization reaction will soon equilibrate:

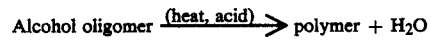

Alcohol oligomer $\xrightarrow{\text{(heat, acid)}}$ polymer + $H_2O$

By providing an ester of a weak organic acid in the reaction mixture, the by-product water is consumed in a hydrolysis reaction of the ester to its corresponding alcohol and carboxylic acid. For example, the inclusion of an ester of a weak organic acid, widely available as inexpensive organic solvents, with the polymerizable resin composition serves both as the solvating agent for the polymerizable resin and as an ester to check water production. Accordingly, the polymerization reaction is driven to the desired degree of completion by the uptake of water in the ester hydrolysis reaction

$$\text{polymer} + H_2O + \text{ester} \longrightarrow \text{alcohol} + \text{carboxylic acid}$$

The amount of resin coated on the gravel as a percent of the weight of gravel and resin is from 2 to 10 percent and the catalyst content as a percent of resin is from 1.0 to 5.0 percent. These concentrations can of course be varied depending on individual characteristics of the selected resin and catalyst as well as formation well conditions encountered in the particular application.

In the procedural application of this process, the resin-coated gravel suspended in the fluid carrier is passed through the well down-hole and permitted to pass through the perforations or other productions means in the well casing, thereby coming to rest in the washed-out zone of the formation adjacent to the producing well. The particles settle in this zone causing contact between the polymer coated portion of the solid component of the injected fluids, which permits the binding reaction to occur as a consequence of the polymerization reaction. As the polymerization occurs, water is produced, but this water is removed by the ester which is incorporated in the resin fluid, which induces the polymerization reaction to go forward. By application of the above procedure and employing the above described materials, a stable, permeable consolidated structure is formed which is resistant to high temperatures and the fluids ordinarily encountered in subterranean petroleum-containing formations including those being subjected to steam flooding, while at the same time retaining sufficient permeability that formation fluids pass through the consolidated mass into the production well.

DETAILED DESCRIPTION OF THE PREFERRED EMBODIMENTS

Our invention will be described with reference to particularly preferred embodiments including those believed to constitute the best mode known to the inventors at the time of this application.

The first step for utilizing the process of our invention to form a consolidated gravel pack in a producing oil well is the formation of the resin-coated gravel. The following discussion pertains to this preparation, which we contemplate will be accomplished on-site at or near the producing well, in order to reduce the cost of supplying the resin-coated gravel for use in forming consolidated gravel packs, especially in remote locations, and to avoid the possible undesired premature polymerization of resin during prolonged storage of resin-coated gravel in warm climates.

The starting point in preparing the resin-coated gravel is obtaining a suitable supply of resin and gravel. As used in this application, the term gravel refers to any particulate solid material which is stable at the conditions that it will encounter in the producing formations over a long period of time. For our purposes, it is only necessary that the granular material be hard, rigid, generally spheroidal particles of material which is substantially inert to crude oil, natural gas, water, brine and other fluids naturally present in subterranean formations and producing wells, as well as to fluids commonly injected into subterranean petroleum formations for the purpose of stimulating oil production. The most common fluid employed for this purpose which is likely to cause difficulty in consolidated gravel packs is steam, and if the well utilized is in a formation being stimulated by steam, great care must be taken to ensure that all of the materials employed in formulating the consolidated gravel pack are stable to steam. As a practical matter, naturally occurring particulate materials such as small pebbles, gravel or sand will be used. The particle size distribution is not critical and any size gravel can be used. The preferred gravel has a predominant portion of its particle size in the range from 15 to 40 mesh.

Ordinarily no special pretreatment gravel will be required prior to subjecting it to the various treatments to be described below, although if the gravel is seriously contaminated with oil or other materials, it should be washed by some suitable means to remove the oily materials from the surface which might interfere with the proper coating of the various fluids.

A solution of suitable resin is prepared, which preferably comprises from 60.0 to 90.0 percent by weight resin in its commercial form, 15 to 30 percent by weight ester such as butyl acetate and from 1.0 to 5.0 percent by weight o-nitrobenzoic acid. A preferred method of formulating this solution is to mix the acid with the ester and then mix four parts of the resin emulsion with one part of this mixture of ester and acid.

The internal catalyst used to catalyze polymerization of the resin is an oil soluble, very slightly water soluble organic acid. The preferred acid is o-nitrobenzoic acid. From 0.05 to 5.0 and preferably from 1.0 to 4.0 percent by weight of the organic acid catalyst is incorporated in the resin solution used to coat the gravel particles with resin.

If gravel coated with resin were suspended in an aqueous medium, the coated particles would begin sticking together immediately, which would interfere with pumping the slurry of a resin-coated gravel down the well and the placement of the coated particles in the desired washed out zone in the formation adjacent to the producing well. It is preferred to neutralize the catalytic activity, but only on the surface of the resin-coated particles, using a material which can be removed after the particles are in place in the washed out cavity, to allow the polymerization of resin to continue between adjacent resin coated gravel particles to form the strong, consolidated gravel pack. A volatile base such as ammonia is used for this purpose. To ensure that the effect is restricted to the surface of the resin coating, the ammonia is incorporated in the carrier fluid used to suspend the coated gravel particles until they have been placed in the formation cavity.

The resin solution and the gravel are mixed together. It is preferred that the volume ratio of gravel to resin solution is from 10 to 30, and preferably 15.0 to 25.0. The gravel and resin emulsion are mixed until the gravel particles are thoroughly coated. The appearance and texture of the material produced by the above procedure is a wet, tacky mass of coated gravel particles. No drying step is utilized because drying equipment would be complicated and expensive to employ in the oil field, and is not needed if the proper carrier fluid is used. The material is much too plastic to permit injection into a wellbore without mixing with some type of carrier fluid. Merely adding the resin-coated gravel particles to water would result in removal of some of the resin, which would greatly reduce the effectiveness of the process and reduce the strength of the polymerized gravel pack. An oil base fluid would not be suitable since the oil would dissolve in the resin coating, rendering it more tacky and reducing the ultimate strength of the polymerized gravel pack. We have discovered that if essentially saturated salt-water is utilized, the resin coating is maintained in the desired state while it is being transported down the injection means of the producing well and placed in the washed-out cavity in the formation adjacent to perforations of the producing well. The high salt content stabilizes the tacky resin-coated gravel particles, dewatering them to a limited extent by osmosis and prevents premature sticking together of the resin-coated gravel particles. Salt contents from 70 percent saturated to 100 percent saturated may be employed, but the best results are achieved if the carrier fluid is essentially saturated with respect to sodium chloride at surface ambient temperature.

In some instances, improved results are obtained if a viscosifying amount of a hydrophilic polymer is added to the saturated salt water employed as a carrier fluid in practicing the process of our inventions. The preferred polymer for this purpose is hydroxyethylcellulose, a nonionic ether of cellulose which is soluble in hot or cold water, but in insoluble in organic solvents. It is stable in concentrated salt solutions and is nontoxic. The material is available commercially under several trade marks, including NATROSOL ® available from Hercules Inc. of Wilmington, Del. Applicants have found that the preferred Hercules product for this purpose is sold as NATROSOL ® 250 HHR. The 250 designation on this trademark indicates a hydroxyethyl moler substitution of 2.5 and the HHR is an indication of the viscosity type.

Other types of viscosifying hydrophilic polymers may be utilized, such as natural gums, or chemically modified natural polymers such as carboxymethly cellulose, methylcellulose, polyvinyl alcohol, ethylene oxide, etc. Any of the hydrophilic polymers normally utilized for oil recovery operations may be utilized provided they are suitable for use in high salinity environments such as are encountered in this application.

Applicants have also found that the viscosity enhancing agent is benefited by incorporation of fluorescent dyes or optical brighteners. For reasons that are not entirely understood, the viscosity of a solution of hydroxyethylcellulose is increased significantly if the fluid also contains a small amount of fluorescent dye material. Commercial products suitable for this purpose include UNITEX RSB ® or TINOPAL CVS by Ciba-Geigy Corporation of Ardsley, N.Y. TINOPAL CVS is a distyryl biphenyl derivative, specifically 2,2'-1,1'-biphenyl-4,4'-diyldi-2,1-ethenediyl) bisbenzenesulfonic acid, disodium salt. These particular dyes are anionic and have a solubility in distilled water of 25° g/l at 25° C., and 300 g/l at 95° C. These and other commercially available fluorescent dyes increase the viscosity of solutions of hydroxyethylcellulose by a substantial degree, especially if the fluid pH is carefully controlled to the range of from 6 to 8. Another useful dye material which applicants have found to be suitable for this purpose is marketed under the trademark BLANCOPHOR SV by BASF-Wyandotte.

Generally we have found that the desired viscosity sufficient to support the resin-coated gravel particles is obtained by using from 0.2 to 1 percent by weight hydroxyethylcellulose and from 0.8 to 1.2 percent by weight fluorescent dye. Persons skilled in the art of preparing and using such fluids will of course recognize that more polymer is required to give the desired viscosity at relatively higher temperatures, and adjustments within the above range may be made as necessary. The objective of incorporating the viscosifying amount of hydrophilic polymer and the carrier fluid of our invention is to support the resin-coated particles and to ensure that minimum abrasive removal of resin from the gravel particles occurs during the time that the fluids are pumped down the injection means of the producing well during their placement in the formation adjacent to perforations of the producing well.

The volume of resin-coated gravel necessary to form the preferred consolidated gravel pack in the portion of the formation immediately adjacent to the producing well depends on the volume of formation which has been washed-out during previous periods of production of fluids and inadvertent production of sand from the formation. This cannot be known with great precision, although persons skilled in the art of performing gravel packs are familiar with the probable volumes required in particular fields. As a general guideline, we expect to form a permeable sand restraining barrier for the majority of the thickness the oil formation extending out from the producing well for a distance of from a few inches to 3 feet. Based on these guidelines, the appropriate amount of resin coated gravel can easily be calculated.

Placing the resin-coated gravel in the washed-out cavity in the formation can usually be accomplished in a day or less. The well is then shut-in and the polymerization of resin sufficient to form the stable consolidated gravel pack is generally achieved after about 7 days at formation temperatures of 200° F. or higher. Lower formation temperatures may require additional acid catalyst. This may require, because of solubility limitations, an acid addition other than o-nitrobenzoic. Chloroacetic can be used in such an instance. For example 1 percent chloroacetic in addition to the o-nitrobenzoic. Another alternative procedure is to supply external heat, by steaming, for example.

To further illustrate the invention, Applicants present the following experimental results and pilot field example to illustrate a preferred embodiment of the process described above, although this is supplied for the purposes of complete disclosure and is not intended to be in any way limitative of the scope of our invention.

EXPERIMENTAL

For the purpose of demonstrating the operability of our process and the results obtained in its application, laboratory test of our invention have been performed.

Resin coated sand was prepared under laboratory conditions. The following procedure was used to prepare the resin coated sand.

A resin mixture was prepared by saturating butyl acetate ester with nitrobenzoic acid. This required about 10 parts by weight of nitrobenzoic acid per 90 parts of butyl acetate ester. This mixture was added to the resin EX18663 (Acme Resin Corp) with the weight ratio of ester mix to resin being 20:80.

The mixture of resin, ester and nitrobenzoic acid was mixed with relatively clean, sand in the ratio of 5 parts of resin mix to 100 parts sand. The resin mix and sand were mixed in a laboratory mixer until the sand was coated with the resin mix. The resin coated sand was placed in a saturated solution of sodium chloride in water and then packed into a section of pipe which was 6 inches long and 1.5 inches in diameter. The pipe was capped and placed in a laboratory oven for one week at 200° F. The pipe was opened and the contents were examined and found to be well consolidated while still retaining sufficient permeability to permit fluid flow.

Based on these results, a scaled-up model of the method of our invention was tested. This test consisted of partially filling a large vat (20 inches diameter, 26 inches height) with four 100 lb bags of Ottawa sand packed around tubing designed to deliver the coated sand into the Ottawa sand. The Ottawa sand was then saturated with a combination of 2 gallons Kern crude and 8 gallons water. The vat's contents were then heated to 250° F. The resin mixture used to coat the sand was then prepared as follows. An o-nitrobenzoic acid saturated butyl acetate solution was added to the resin in a weight ratio of 20 parts ester to 80 parts resin. The resin mix was then added to the uncoated sand in a ratio of 5 parts resin to 100 parts sand by volume and stirred until thoroughly coated. A liter of coated sand was prepared, placed in a saturated sodium chloride solution and pumped into the vat. The temperature in the vat was then maintained for one week. Consolidation was complete.

PILOT FIELD EXAMPLE

A producing well is completed in a subterranean petroleum-containing formation, the formation being from 8520 to 8588 feet. Considerable sand has been produced along with the oil from this formation, and so it is expected that a significant cavity has been produced around the perforations of the producing well. The well must be shut down periodically to remove the sand, and the frequency of such shut-in periods is increasing as a consequence of an increasing rate of production of sand from the formation. In order to reduce the necessity for periodically shutting in the well and to avoid the possible risk of collapse of the formation around the producing well which might destroy the well, it is decided to form a consolidated gravel pack just outside the perforations of the producing well for the purpose of stabilizing the formation and restraining the flow of formation sand into the well while permitting free flow of formation fluids including petroleum. Based on the volume of sand that has been produced since the well has first been completed, it is estimated that the average diameter of the void space around the well is about 2 feet around the outer perforations of the producing well. Accordingly, the volume of washed-out zone in the formation to be treated around this well, whose outside casing diameter is 10 inches, is given below:

$$(3.14)(2)^2(68) - (3.14)(10/12)^2(68) = 705 \text{ cu.ft.}$$

In order to adequately fill the above described cavity, a total of 705 cubic feet of resin coated gravel must be positioned in the formation. In order to accomplish this, a total of 26 cubic yards of gravel having an average particle size of 30 mesh is obtained, washed and dried. Several mixing tanks are positioned on the surface along with a 3 cubic yard concrete mixer which is utilized for the step of coating the sand grains with the resin. The resin employed in this procedure is QO1300 obtained from QO Chemicals. This is an oligomer of furfuryl alcohol, which applicants have found to be especially suitable for use in the process of this invention. In order to properly coat the 705 cubic feet of sand employed in this process, a total of 18,330 pounds of this resin are required.

2,400 Gallons of the resin solution is formulated by mixing 1,833 gallons of the above described resin with 667 gallons of butyl acetate saturated with nitrobenzoic acid. The resin solution is prepared by first saturating the ester with nitrobenzoic acid and then mixing four parts of resin to this fluid mixture.

The gravel particles are then mixed with the resin solution in the ratio of 1 part by volume resin mix to 10 parts by volume sand. Mixing requires about 2–5 minutes per batch in order to ensure complete coating of the sand grains with the resin, after which each batch of resin coated sand is added to a tank containing essentially saturated salt water which also contains 0.2–0.8 percent by weight hydroxyethylcellulose and 0.1 percent by weight fluorescent dye to provide the needed viscosity for placement of the resin coated sand grains in the formation. This mixture, comprising the saturated salt carrier fluid and the suspended resin coated gravel are then pumped down a tubing string positioned in the producing well for the purpose of this workover operation. The fluid mixture passes out through the perforations and to the washed-out cavity in the formation.

The above procedure is continued on a batch process due to the limitations of the mixer volume until the total desired amount of resin coated gravel has been formed, suspended in the viscosified brine carrier fluid and injected into the well where the particles pass through the perforations and form a filter cake on the formation face, gradually filling up the washed-out cavity. Less than one day is required for forming the resin-coated gravel and injecting same into the formation. After the last batch of coated gravel has been injected, the well is shut-in for a period of seven days, sufficient for the resin material to polymerize, binding the sand grains together while still maintaining sufficient permeability to permit passage of fluid there through.

Although our invention has been described in terms of a series of specific preferred embodiments and examples which Applicants believe to include the best mode for applying their invention known to applicants at the time of this application, it will be recognized to those skilled in the art that various changes may be made in the composition and methods described herein without departing from the true spirit and scope of our invention which is defined more precisely in the claims appended hereinafter below.

What is claimed:

1. A method for forming a consolidated gravel pack in a washed-out cavity adjacent to a producing well penetrating a subterranean oil formation comprising the steps of:
   (a) forming a quantity of resin coated gravel comprising granular mineral particles including gravel, said gravel particles being coated with a resin fluid containing a polymerizable oligomer of furfuryl alcohol resin, a catalyst comprising an oil soluble, very slightly water soluble organic acid and an ester of a weak organic acid to consume water produced by the polymerization of resin, said polymer coated gravel comprising a sticky solid material;
   (b) preparing an aqueous saline carrier fluid comprising water which is from 70 to 100% saturated with sodium chloride;
   (c) suspending said resin-coated gravel in the carrier fluid, forming a fluid mixture of resin-coated gravel and carrier fluid;
   (d) introducing the fluid mixture comprising the resin coated gravel particles suspended in the aqueous saline carrier fluid into the washed-out cavity of the formation adjacent to the producing well and shutting in the well for sufficient period of time to allow polymerization of the resin, forming the permeable gravel pack in the washed-out cavity of the formation.

2. A method as recited in claim 1 wherein the resin coated gravel is prepared by adding gravel to a resin solution in the volume ratio of from 8 to 30 parts gravel to one part resin solution.

3. A method as recited in claim 2 wherein the resin is an oligomer of furfuryl alcohol.

4. A method as recited in claim 1 wherein the ester is butyl acetate.

5. A method as recited in claim 4 wherein the concentration of ester in the resin fluid is from 60 to 90 percent by weight.

6. A method as recited in claim 1 wherein the organic acid in the resin fluid is anthranilic acid.

7. A method as recited in claim 1 wherein the concentration of organic acid in the resin fluid is from 0.5 to 5.0 percent by weight.

8. A method as recited in claim 1 wherein the carrier fluid also contains ammonium hydroxide.

* * * * *